United States Patent [19]

Apecetche et al.

[11] Patent Number: 5,733,988
[45] Date of Patent: Mar. 31, 1998

[54] PROCESS FOR REDUCING POLYMER BUILD-UP IN RECYCLE LINES AND HEAT EXCHANGERS DURING POLYMERIZATIONS EMPLOYING BUTADIENE, ISOPRENE, AND/OR STYRENE

[75] Inventors: Maria Angelica Apecetche; Bai Xinlai, both of Piscataway; Kevin Joseph Cann, Rocky Hill, all of N.J.

[73] Assignee: Union Carbide Chemicals & Plastics Technology Corporation, Danbury, Conn.

[21] Appl. No.: 742,029

[22] Filed: Nov. 1, 1996

Related U.S. Application Data

[63] Continuation-in-part of Ser. No. 540,985, Oct. 11, 1995, Pat. No. 5,625,012, which is a continuation of Ser. No. 269,048, Jun. 29, 1994, abandoned.

[51] Int. Cl.$^6$ ........................ C08F 2/34
[52] U.S. Cl. ............... 526/74; 526/68; 526/164; 526/171; 526/335; 526/347.2
[58] Field of Search ............... 526/74, 68, 164, 526/171, 335, 347.2

[56] References Cited

U.S. PATENT DOCUMENTS

| | | | |
|---|---|---|---|
| H860 | 12/1990 | Job | 525/247 |
| 4,059,720 | 11/1977 | Kolling et al. | 526/74 |
| 4,326,048 | 4/1982 | Stevens et al. | 526/68 |
| 4,404,344 | 9/1983 | Sinn et al. | 526/160 |
| 4,536,484 | 8/1985 | Lacombe et al. | 502/62 |
| 4,542,199 | 9/1985 | Kaminsky et al. | 526/160 |
| 4,803,251 | 2/1989 | Goode et al. | 526/59 |
| 4,855,370 | 8/1989 | Chirillo et al. | 526/74 |
| 4,956,427 | 9/1990 | Jenkins, III et al. | 526/62 |
| 4,994,534 | 2/1991 | Rhee et al. | 526/88 |
| 5,026,795 | 6/1991 | Hogan | 526/74 |
| 5,028,670 | 7/1991 | Chinh et al. | 526/73 |
| 5,034,480 | 7/1991 | Funk et al. | 526/74 |
| 5,037,905 | 8/1991 | Cummings et al. | 526/74 |
| 5,118,757 | 6/1992 | McCullough, Jr. | 525/53 |
| 5,194,526 | 3/1993 | Hussein et al. | 526/74 |
| 5,200,502 | 4/1993 | Kao et al. | 528/494 |
| 5,332,706 | 7/1994 | Nowlin et al. | 502/107 |
| 5,391,657 | 2/1995 | Song et al. | 526/74 |
| 5,432,242 | 7/1995 | Baron | 526/68 |
| 5,474,961 | 12/1995 | Schlund et al. | 502/103 |

FOREIGN PATENT DOCUMENTS

| | | |
|---|---|---|
| 0254234 | 1/1988 | European Pat. Off. . |
| 0359444 | 3/1990 | European Pat. Off. . |
| 0376559 | 7/1990 | European Pat. Off. . |
| 0446059 | 9/1991 | European Pat. Off. . |
| 0630910 | 12/1994 | European Pat. Off. . |
| 0634421 | 1/1995 | European Pat. Off. . |
| WO 9513305 | 5/1995 | WIPO . |

OTHER PUBLICATIONS

Chemical Abstract No. 122:32108.
Chemical Abstract No. 120:135354.
Chemical Abstract No. 100:192366.
Chemical Abstract No. 95:25752.
Chemical Abstract No. 119:73188.
WPIDS Derwent Abstract No. 93–061647 [08].
WPIDS Derwent Abstract No. 93–061646 [08].
WPIDS Derwent Abstract No. 93–012712 [02].
WPIDS Derwent Abstract No. 93–012711 [02].
WPIDS Derwent Abstract No. 85–204713 [34].

*Primary Examiner*—Thomas R. Weber
*Attorney, Agent, or Firm*—B. L. Deppenbrock

[57] ABSTRACT

A method for inhibiting polymer build-up in a recycle line and a heat exchanger during a polymerization process of one or more alpha olefins, particularly sticky polymers, or of one or more diolefins such as butadiene, isoprene, styrene, or styrene and butadiene which method comprises introducing as an antifouling agent an alcohol having 1 to 20 carbon atoms, an alkyl or cycloalkyl ether having 2 to 20 carbon atoms, ammonia, an ester of an inorganic acid, a compound of a group IV element of the periodic table, alkyl and aryl amines, a sulfur-containing compound, or a mixture thereof at one or more locations in the recycle gas line in an amount sufficient to inhibit polymer buildup.

11 Claims, No Drawings

PROCESS FOR REDUCING POLYMER BUILD-UP IN RECYCLE LINES AND HEAT EXCHANGERS DURING POLYMERIZATIONS EMPLOYING BUTADIENE, ISOPRENE, AND/OR STYRENE

This application is a continuation-in-part application of U.S. Ser. No. 08/540,985, filed Oct. 11, 1995 now U.S. Pat. No. 5,625,012, which is a continuation of U.S. Ser. No. 08/269,048 filed Jun. 29, 1994, now abandoned.

FIELD OF THE INVENTION

This invention relates to the copolymerization of alpha olefins such as ethylene and propylene, the homopolymerization of butadiene, isoprene, or styrene and the copolymerization of styrene and butadiene. More particularly, the present invention relates to a process for reducing polymer build-up or fouling in the recycle lines and heat exchangers during the polymerization of alpha olefins and diolefins, particularly sticky polymers, in a gas phase, fluidized bed reactor system.

BACKGROUND OF THE INVENTION

Although the invention in this disclosure is described with reference to copolymerization of propylene and ethylene, especially sticky polymers, it will be understood that the invention can be readily applied to the polymerization or copolymerization of other alpha-olefin monomer combinations such as ethylene-hexene, polyethylene, polypropylene, propylene-butene, propylene-hexene and also terpolymer systems as well as the homopolymerization of diolefins such as butadiene, isoprene, or styrene and the copolymerization of styrene and butadiene.

Sticky polymers are defined as polymers which, although particulate at temperatures below the sticking or softening temperature, agglomerate at temperatures above the sticking or softening temperature. A polymer may be inherently sticky due to its chemical or mechanical properties or pass through a sticky phase during the production cycle. Sticky polymers are also referred to as non-free flowing polymers because of their tendency to compact into agglomerates of much larger size than the original particles. To avoid agglomeration problems in the past, these polymers have been produced at temperatures below the softening temperature.

However, U.S. Pat. No. 4,994,534 has taught a process for polymerizing sticky polymers at temperatures at or above the softening point of the sticky polymers in the presence of an inert particulate material (carbon black, silica, clays, talc, and other like materials and mixtures of them). This patented process generally enhances the yield of product in relation to the catalyst and makes purging of the polymer product more efficient. In this polymerization process, sticky polymers are produced in a single reactor or by two or more reactors in series. Typically, the polymerization reaction in a gas phase reactor is catalyzed by a transition metal catalyst.

Unfortunately, during normal operations, the inner surfaces of the recycle gas lines and the inner surfaces of the tubes of the heat exchanger or cooler tend to foul with undesirable polymer deposits. Fouling in the recycle gas lines reduces gas flow and impedes the heat exchanger's capability of cooling recycled gas. As a consequence, the reactor must be shut down within a short time for cleaning. There is a need to reduce polymer build-up in the recycle lines and heat exchangers during the polymerization of sticky polymers in gas phase fluidized reactor system.

U.S. Pat. No. 5,037,805 has disclosed a method for inhibiting polymer buildup in a heat exchanger during gas phase polymerization of alpha-olefins by introducing upstream of the heat exchanger para-ethyl-ethoxybenzoate (PEEB) in an amount sufficient to inhibit polymer buildup. However, there is an on-going need for additional methods for inhibiting polymer buildup in recycle lines and heat exchangers employed in gas phase fluidized bed polymerization processes.

SUMMARY OF THE INVENTION

It has been found that by adding an alcohol having 1 to 10 carbon atoms, an alkyl or cycloalkyl ether having 2 to 20 carbon atoms, or a mixture thereof as an antifouling agent at one or more locations in the recycle gas line reduces polymer build-up or fouling of the recycle lines and heat exchanger.

Accordingly, one embodiment of the present invention provides a method for inhibiting polymer build-up in a recycle line and a heat exchanger during the polymerization of alpha olefins which comprises introducing as an antifouling agent an alcohol having 1 to 10 carbon atoms, an alkyl or cycloalkyl ether having 2 to 20 carbon atoms, or a mixture thereof at one or more locations in the recycle gas line in an amount sufficient to inhibit polymer build-up.

In another embodiment there is provided a method for inhibiting polymer build-up in a recycle line and a heat exchanger during polymerization of butadiene, isoprene, styrene, and mixtures thereof in the presence of a rare earth metal catalyst or transition metal catalyst or mixtures thereof which comprises introducing an antifouling agent selected from the group consisting of (i) an alcohol having 1 to 20 carbon atoms, (ii) an alkyl or cycloalkyl monoether having 2 to 20 carbon atoms, (iii) ammonia, (iv) an ester of an inorganic acid, (v) a compound of group IV of the periodic table of elements, (vi) a sulfur-containing compound, (vii) an alkyl or aryl amine, (viii) and a mixture thereof at one or more locations in the recycle gas line in an amount sufficient to inhibit build-up of polybutadiene, polyisoprene, or styrene-butadiene copolymer, respectively.

DETAILED DESCRIPTION OF THE INVENTION

Sticky Polymers

The preferred olefins produced by the present invention are ethylene propylene copolymers and homopolymers of butadiene, styrene, and isoprene, and copolymers of styrene and butadiene. Most preferably, the alpha olefins produced by the method of the present invention are ethylene propylene copolymers known as sticky polymers. Examples of sticky polymers can include ethylene/propylene rubbers, ethylene/propylene/diene rubbers, polybutadiene and polyisoprene rubbers, polystyrene, styrene-butadiene rubbers, high ethylene content propylene/ethylene block copolymers, poly(1-butene) when produced under certain reaction conditions, very low density (low modulus) polyethylenes, i.e., ethylene butene rubbers or hexene containing terpolymers, ethylene/propylene/ethyldiene norbornene, and ethylene/propylene hexadiene terpolymers of low density.

Ethylene-propylene copolymer and terpolymer rubbers are used in automotive applications such as weather stripping, hoses, tire sidewalls, and ignition cables. These rubbers are also used in wire and cable, construction, hose and tubing, and mechanical applications. Ethylene-propylene rubbers comprise polymer products that vary widely in composition, viscosity, and molecular weight distribution. Polybutadiene, polyisoprene, polystyrene, and styrene-butadiene rubbers and like polymers are likewise useful in tires and tire applications.

Antifouling Agent

Antifouling agents (or antifoulant) employed in the present invention are selected from the group consisting of a linear or branched alcohol having 1 to 10 carbon atoms, an alkyl or cycloalkyl ether having 2 to 20 carbon atoms, and a mixture thereof. Preferably, the antifouling agent is selected from the group consisting of an alcohol having 1 to 6 carbon atoms, an alkyl or cycloalkyl monoether, having 2 to 12 carbon atoms, and a mixture thereof. Most preferably, the antifouling agent is methanol, ethanol, isopropanol, tetrahydrofuran (THF), an alkyl or cycloalkyl monoether, and a mixture thereof. Additionally, in the polymerization of butadiene, isoprene, styrene, and styrene-butadiene rubbers, ammonia, an ester of an inorganic acid, a compound of group IV of the periodic table of the elements, alkyl or aryl amine, and a sulfur-containing compound can be employed as antifouling agents alone or in combination with any other antifouling agent.

Esters of inorganic acids can include, for example, dimethyl sulfate, diethyl sulfate, demethyl sulfite, triphenyl phosphate, trimethyl phosphite, dimthyl carbonate, trimethyl borate, tetramethyl silicate, tetraethyl silicate, and mixtures thereof. Of these, dimethyl sulfate and trimethyl phosphite are preferred.

Compounds of group IV of the periodic table of the elements can include, for example, methylsilane, dimethylsilane, diethylsilane, triethylsilane, tris (trimethylsilyl)silane, triethylgermane, triphenylstannane, and mixtures thereof. Of these, the silanes are preferred.

Alkyl amines having i to 20 carbon atoms, preferably 1 to 10 carbon atoms, and most preferably 1 to 4 carbon atoms can be used as anitfoulants. Likewise, aryl amines having 6 to 24 carbon atoms, preferably 6 to 14 carbon atoms can serve as anitfouling agents. Especially prefered of the alkyl and aryl amines are butyl amine and aniline.

Illustrative sulfur-containing compounds can include, for example, hydrogen sulfide, thiophenols, m-thiocresol, p-thiocresol, benzylmercaptan, 2-chlorobenzylmercaptan, 4-chlorobenzylmercaptan, 1-naphtalenethio, 3,4-dimercaptotoluene 4-methoxy-alphatoluenethiol, 1,2-ethanedithiol, 2,3-butanedithiol, 1,4-butanedithiol, 1,3-propanedithiol, and mixtures thereof.

When an antifouling agent such as isopropanol is employed, it can be used preferably neat or is diluted with a hydrocarbon solvent such as isopentane for good dispersion. Other suitable hydrocarbon solvents can include, for example, hexane and heptane. When a solvent is employed, the amount of antifouling agent in solution (antifoulant plus solvent) ranges from about 1% to 100%, preferably about 1% to 20%, and most preferably about 4% to 10%. The amount of antifouling agent used can vary over a range of about 100 to about 2000 pounds of antifouling agent per million pounds of sticky resin produced (that is, 0.01% to about 0.2% based on the weight of resin being produced). Use of lower amounts will be less effective in preventing polymer buildup, while use of larger amounts will adversely affect the operation of the reactor, more specifically the catalyst activity. Preferred amounts of antifouling agent are within the range of about 200 to about 1000 pounds per million pounds, i.e., 0.02% to about 0.1% based on the weight of resin being produced. For example, when isopropanol is used to reduce fouling, it is fed into the recycle line at one or more locations where fouling is prone to occur. Preferably, the antifouling agent is fed into the recycle line in at least two separate locations. The agent can be fed intermittently or continually, and preferably, it is fed continuously. The antifouling agent should not be added to the reactor as this can adversely affect the polymerization process due to the formation of undesirable side reactions and/or inactivation of the catalyst system. It is believed that the antifouling agent selectively interacts with the cocatalyst in the recycle line gas or on entrained particles to reduce or eliminate polymer buildup in the recycle line and/or the heat exchanger.

Polymerization Conditions

For the polymerization process of the invention, the fluidized bed can be a stirred fluidized bed reactor or a fluidized bed reactor which is not stirred. Preferably, the polymerization is conducted in a gas phase reactor. The present invention is not limited to any specific type of gas phase polymerization reaction. In addition to conventional gas phase polymerization processes, "condensed mode" including the so-called "induced condensed mode" and "liquid monomer mode" operation of a gas phase polymerization can be employed.

A conventional fluidized bed process for producing resins, such as disclosed in U.S. Pat Nos. 4,482,687 and 5,304,588, is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor alone with make-up monomer added to the recycle stream.

Condensed mode polymerizations are disclosed in U.S. Pat. Nos. 4,543,399; 4,588,790; 4,994,534; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition condensable fluids of the polymerization process itself other condensable fluids, inert to the polymerization can be introduce to "induce" condensing mode operation. Examples of suitable condensable fluids may be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it desirable that the liquid entering the fluidized bed be dispersed and vaporized quickly.

Liquid monomer polymerization mode, sometimes referred to as liquid bed mode, is disclosed, in U.S. Pat. No. 5,453,471, U.S. Ser. No. 510,375, now pending; PCT 95/09826(US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced. In general, liquid monomer process are conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter. This liquid monomer mode or wet bed mode of polymerization is the preferred process for producing polybutadiene, polyisoprene, polystyrene, and styrene-butadiene rubber in the gas phase.

Preferably, the polymerizations of the invention are carried out in the gas phase, preferably in a fluidized bed made up of, or containing a "seed bed", of ethylene polymer, particulate ethylene-propylene polymer (EPM), ethylene-propylene-diene terpolymer (EPDM), polybutadiene, polyisoprene, styrene-butadiene rubber, or mixtures thereof. The bed is usually made up of the same granular resin that is to be produced in the reactor. Accordingly, using a seed bed of starting material (particulate polymer) which is the same or substantially the same as the polymer to be produced is preferred. Typically, a seed bed (having a moisture content of 20 to 600 ppm) from a previous run, optionally also containing inert particulate material (fluidization aid), is employed. This bed can be dried to 300 to 400 ppm or less and optionally passivated with an aluminum alkyl (e.g., co-catalyst) before commencing polymerization. Thus, during the course of the polymerization, the bed comprises formed polymer particles, growing polymer particles, and catalyst particles fluidized by polymerizing and modifying gaseous components introduced at a flow rate or velocity sufficient to cause the particles to separate and act as a fluid.

The fluidizing gas is made up of the initial feed, make-up feed, and cycle (recycle) gas, i.e., monomers and, if desired, modifiers and/or an inert carrier gas (nitrogen, argon, hydrocarbon, e.g. ethane). A typical cycle gas is comprised of one or more monomers, nitrogen, and hydrogen, either alone or in combination. The process can be carried out in a batch or continuous mode, the latter being preferred. The essential parts of the reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

Variations in the reactor can be introduced if desired. One involves the relocation of one or more cycle gas compressors from upstream to downstream of the cooler and another involves the addition of a vent line from the top of the product discharge vessel (stirred product tank) back to the top of the reactor to improve the fill level of the product discharge vessel.

In terms of the fluidized bed, a superficial gas velocity of about 1 to about 4.5 feet per second and preferably about 1.5 to about 3.5 feet per second can be used. The total reactor pressure can be in the range of about 150 to about 600 psia and is preferably in the range of about 250 to about 500 psia. The ethylene partial pressure can be in the range of about 25 psi to about 350 psi and is preferably in the range of about 60 psi to about 250 psi. Ethylene propylene rubbers polymerizations are performed above the softening temperature of the polymer, i.e., about 20° C. to about 70° C. The gaseous feed streams of ethylene, propylene, and hydrogen (or other chain transfer agent) are preferably fed to the reactor recycle line while liquid ethylidene norbornene or another diene, if used, is preferably fed directly to the fluidized bed reactor to enhance mixing and dispersion. The composition of the EPM or EPDM product can be varied by changing the propylene/ethylene molar ratio in the gas phase and the diene concentration in the fluidized bed. The product is intermittently discharged from the reactor as the bed level builds up with polymerization. The production rate is controlled by adjusting the catalyst feed rate.

The propylene/ethylene molar ratio is adjusted to control the level of propylene incorporated into the copolymer or terpolymer. For the vanadium catalyst described above, a range of about 0.35:1 to about 3:1 is preferred. The hydrogen/ethylene molar ratio is adjusted to control average molecular weights. For the same catalyst system, a range of about 0.0005:1 to about 0.3:1 is preferred. The level of diene in the bed, if used, is in the range of about 1 to about 15 weight percent based on the weight of the bed, and is preferably in the range of about 2 to about 10 weight percent. Examples of useful dienes, in addition to ethylidene norbornene (ENB), are 1,4-hexadiene and dicyclopentadiene dimer.

The residence time of resin in the fluidized bed can be in the range of about 1.5 to about 8 hours and is preferably in the range of about 2 to about 5 hours. The molecular weight can be controlled with hydrogen or other chain transfer agents. The final ethylene propylene monomer (EPM) or ethylene propylene diene monomers (EPDM) product can contain the following amounts of reacted comonomers: about 35 to about 80 percent by weight ethylene; about 18 to about 50 percent by weight propylene; and about 0 to about 15 percent by weight diene. The crystallinity, also in weight percent based on the total weight of the EPM or EPDM, can be in the range of zero (essentially amorphous) to about 15 percent by weight (nearly amorphous). The Mooney viscosity can be in the range of about 10 to about 150 and is preferably about 30 to about 100. The Mooney viscosity is measured by introducing the EPM or EPDM into a vessel with a large rotor, preheating for one minute at 100° C., and then stirring for four minutes at the same temperature. The viscosity is measured at 100° C. in the usual manner.

Preferably, the process for the production of EPRs comprises contacting a mixture comprising ethylene, propylene, and, optionally, a diene, in the gas phase, under polymerization conditions, with a catalyst system comprising:

(a) a catalyst precursor, in independent or prepolymer form, consisting of vanadium (acetylacetonate)$_3$;

(b) optionally, a support for said precursor
(c) a cocatalyst consisting essentially of (i) an alkylaluminum halide having the formula $AlR_{(3-a)}X_a$ wherein each R is independently alkyl having 1 to 14 carbon atoms; each X is independently chlorine, bromine, or iodine; and a is 1 or 2, and (ii) optionally, a trialkylaluminum provided that the molar ratio of alkylaluminum halide to trialkylaluminum is about 1:1 to 10:1; and
(d) optionally, a promoter, which is a chlorinated ester having at least 2 chlorine atoms; a saturated or unsaturated aliphatic halocarbon having at least 3 carbon atoms and at least 6 halogen atoms; or a haloalkyl substituted aromatic hydrocarbon wherein the haloalkyl substituent has at least 3 halogen atoms.

The catalyst precursor is vanadium (acetylacetonate)$_3$, a known compound having one vanadium cation and three enolate anions prepared by conventional processes. It can also be referred to as vanadium triacetylacetonate.

As noted above, a support is optional. If used, the support can be silica, alumina, or polymeric; however, silica is preferred. Examples of polymeric supports are porous crosslinked polystyrene and polypropylene. A typical silica or alumina support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.5 millimole of vanadium per gram of support and preferably about 0.3 to about 0.9 millimole of vanadium per gram of support. Impregnation of the above mentioned catalyst precursor into a silica support can be accomplished by mixing the precursor and silica gel in an inert solvent followed by solvent removal under reduced pressure.

Spray-drying technology can be used to generate well shaped catalyst precursors having little or no silica or other inorganic solids content.

The cocatalyst consists essentially of an alkylaluminum halide having the formula $AlR_{(3-a)}X_{(a)}$ wherein each R is independently alkyl having 1 to 14 carbon atoms; each X is independently chlorine, bromine, or iodine; and a is 1 or 2, and, optionally, a trialkylaluminum compound. Alkylaluminum halides falling within the above formula include alkylaluminum mono- and dichlorides wherein each alkyl radical has 1 to 6 carbon atoms. Examples of the alkylaluminum halides are diethylaluminum chloride; ethylaluminum dichloride; ethylaluminum sesquichloride; di-n-butylaluminum chloride; diisobutylaluminum chloride; methylaluminum sesquichloride; isobutylaluminum sesquichloride; dimethylaluminum chloride; di-n-propylaluminum chloride; methylaluminum dichloride; and isobutylaluminum dichloride.

Examples of the trialkylaluminum compounds, which can have the formula $AlR_3$ wherein R is the same as above are as follows: triisobutylaluminum, trihexylaluminum, di-isobutylhexylaluminum, isobutyl dihexyl-aluminum, trimethylaluminum, triethylaluminum, tripropylaluminum, triisopropylaluminum, tri-n-butylaluminum, trioctylaluminum, tridecylaluminum, and tridodecylaluminum. The molar ratio of alkylaluminum halide to trialkylaluminum compound, if present, is at least about 1.5:1, and is preferably in the range of about 2:1 to about 5:1.

The cocatalyst can be present in the catalyst system in an amount of about 10 to about 500 moles of cocatalyst per gram atom of vanadium, and is preferably introduced in an amount of about 50 to about 150 moles of cocatalyst per gram atom of vanadium. In a fluidized bed process, the cocatalyst can be introduced in an amount of about 1000 to about 10,000 parts per million parts (ppm) by weight of resin (polymer and fluidization aid, if any), and preferably in an amount of about 1500 to about 5000 parts per million parts of resin. About 0.01 to about 10 moles, and preferably about 0.1 to about 2 moles, of promoter can be used per mole of cocatalyst. In the fluidized bed process, the promoter can be introduced in an amount of about 500 to about 2500 parts per million parts (ppm) by weight of resin present in the fluidized bed plus, and preferably in an amount of about 800 to about 1800 parts per million parts of resin.

The optional promoter can be a chlorinated ester having at least 2 chlorine atoms or a perchlorinated ester. It can be impregnated into the support, if desired. Suitable esters are $Cl_3CCOOC_2H_5$ (ethyl trichloroacetate); $Cl_3CCOOCH_3$ (methyl trichloroacetate); $CCl_3CCl=CClCOOC_4H_9$; $C_6H_5CCl_2COOR$ wherein R is an alkyl radical having 1 to 8 carbon atoms; and $Cl_2C=CCl—CCl_2COOC_4H_9$. The promoter can also be a saturated aliphatic halocarbon having the formula $C_3(X)_a(F)_b(H)_c$ wherein each X is independently chlorine, bromine, or iodine; a is an integer from 6 to 8; b and c are integers from 0 to 2; and a+b+c equal 8. Examples of these halocarbon promoters are hexachloropropane, heptachloropropane, and octachloropropane. These saturated halocarbon promoters are mentioned in U.S. Pat. No. 4,892,853. In addition, the promoter can also be an unsaturated aliphatic halocarbon such as perchloropropene or any unsaturated halocarbon having a $CX_3$ group attached to a C=C group wherein each X is independently chlorine, bromine, or iodine, or a haloalkyl substituted aromatic hydrocarbon wherein the haloalkyl substituent has at least 3 halogen atoms such as trichlorotoluene, and trichloroxylene. Again, the halogen can be chlorine, bromine, or iodine. The number of carbon atoms in the halocarbon or the haloalkyl substituent can be 1 to 14, and the number of benzene rings in the halocarbon or the aromatic hydrocarbon can be 1 to 3, but is preferably one.

As noted, the catalyst precursor can be impregnated into a support, if desired. In any case, the catalyst precursor, with or without the support, is dried. It can be introduced into the polymerization reactor in the supported form; as a liquid feed dissolved in a solvent; or in spray-dried form. The precursor is usually added prior to the introduction of the comonomers in a batch process, and continuously in a continuous process. The cocatalyst and promoter are preferably added separately neat or as solutions in an inert solvent, such as isopentane, to the polymerization reactor at the same time as the flow of monomers are initiated.

The catalyst precursor described above can be used in prepolymer form. A technique for prepolymerization can be found in U.S. Pat. No. 4,970,279. Typically, the prepolymerization is carried out in the liquid phase in a similar manner to a diluent slurry polymerization. The catalyst system used in the prepolymerization is the same one that will be used in the gas phase polymerization. The difference lies in the monomers used and weight ratio of monomer(s) to catalyst precursor, which is at least about 10:1, and is typically about 50:1 to about 300:1. It should be pointed out that the numbers vary with the particular catalyst system selected. The prepolymer does not have to be the same as the resin product of the main polymerization.

The amount of prepolymer formed, in terms of grams of prepolymer per gram of catalyst precursor, generally depends on the composition of the prepolymer, the composition of the polymer being produced, and the productivity of the catalyst employed. The prepolymer loading is chosen so as to minimize prepolymer residue in the product resin. When using ethylene/propylene coprepolymers, prepolymer loading can be in the range of about 10 to about 500 grams of prepolymer per gram of catalyst precursor and is preferably in the range of about 50 to about 300 grams of prepolymer per gram of catalyst precursor.

A typical prepolymerization can be carried out in a slurry prepolymerizer. The equipment includes a monomer feed system, a reaction vessel, and an inert screener. The reactor is a jacketed pressure vessel with a helical ribbon agitator to give good solids mixing, and with a bottom cone to facilitate solids discharge. Ethylene is fed from cylinders, with the pressure regulated, through 4A or 13X molecular sieves to remove impurities, and then through a flow meter to measure flow rate. Other olefins, if required, are fed from cylinders via a dip tube with nitrogen pressure supplied to the cylinder headspace. They also pass through 4A or 13X molecular sieves and through a flow meter. The monomers can be fed to either the reactor headspace or subsurface, with subsurface preferred as it increases the reaction rate by eliminating one mass transfer step. Temperature is controlled with a closed loop tempered water system. Pressure is controlled with a vent/make-up system.

The finished prepolymerized catalyst is screened to remove skins, agglomerates, and other types of oversize particles that could cause feeding difficulties into the gas phase reactor. The screening is done with a vibratory screener with a 20 mesh screen. The screener is kept under a nitrogen atmosphere to maintain the prepolymerized catalyst activity. Oversize material is collected for disposition. The desired undersize fraction is discharged into a cylinder for storage and shipping.

The typical prepolymerization is a slurry polymerization of ethylene and one or more comonomers under mild conditions. Isopentane, hexane, and heptane can be used as the solvent, with isopentane preferred for its higher volatility. Mild conditions are necessary to minimize catalyst decay during the prepolymerization so that there is sufficient activity for the subsequent gas phase polymerization, which may occur months after the prepolymerization. Such conditions will vary with different catalyst systems, but are typically temperatures of about 25 to about 70° C., monomer partial pressures of about 15 to about 40 psi, and levels of cocatalyst and catalyst promoter of about 1 to about 5 moles per mole of vanadium. The prepolymer loading ranges from about 10 to about 500 grams of prepolymer per gram of supported catalyst precursor, preferably from about 50 to about 300 grams per gram. The comonomer content of the prepolymer can range from about 1 to about 40 weight percent. Hydrogen, or other chain transfer agents, can be added at the start of polymerization or throughout the polymerization to control molecular weight. When the polymerization is complete, the agitator is stopped and the solids are allowed to settle so that the excess solvent can be removed by decanting. The remaining solvent is removed by drying, using low temperatures to avoid catalyst decay. The dried prepolymer catalyst is discharged to a storage cylinder through an inert screener, to remove oversize (+20 mesh) material.

As noted, the process of this invention can also be used to produce polyethylenes. These polyethylenes are homogeneous, characterized by narrow molecular weight distributions and narrow comonomer distributions. A typical process is described in U.S. Pat. No. 4,508,842. The catalyst precursor can be used in prepolymer form in polyethylene production just as in EPR production. The preferred temperature for the production of homogeneous polyethylenes is in the range of about 65° C. to about 85° C. The polyethylenes are, generally, copolymers of ethylene and one or more alpha-olefins having 3 to 12 carbon atoms, and preferably 3 to 8 carbon atoms. Examples of the alpha-olefins are propylene, 1-butene, 1-hexene, 4-methyl-1-pentene, and 1-octene. Typical comonomer molar ratios are as follows: the propylene/ethylene ratio can be in the range of about 0.05:1 to about 2.5:1 and is preferably in the range of about 0.25:1 to about 1.5:1. The 1-hexene/ethylene molar ratio can be in the range of about 0.005:1 to about 0.050:1 and is preferably in the range of about 0.008:1 to about 0.012:1. Homogeneous polyethylene can be generally effected with any vanadium precursor wherein vanadium is in the oxidation state of plus three or greater. The precursors can include, for example, $V(AcAc)_3$, $VOCl_3$, $VCl_3THF_3$, and $VO(OR)_3$ or a catalyst system as described in U.S. Pat. No. 4,508,842. However, vanadium precursors other than $V(AcAc)_3$ are not preferred embodiments. Vanadium compounds which can be used to provide these precursors can be found, for example, in U.S. Pat. No. 4,918,038.

Polybutadiene and polyisoprene, as well as polystyrene and styrene butadiene rubbers can be produced in the gas phase by use of a transition metal catalyst (including nickel, titanium, and cobalt) as described in the above-described process for making EPRs and EPDMs, that is above the softening temperature of the final polymer product. However, in this invention, polybutadiene, polyisoprene, polystyrene, or styrene-butadiene rubber are preferably produced in accordance with the processes and procedures disclosed in WO 96/04323 (PCT/US95/09827) in the presence of a rare earth metal catalyst. Alternatively, polybutadiene, polyisoprene, polystyrene, or styrene-butadiene rubber can be produced using the procedures disclosed in WO 96/04322 (PCT/US95/09826) in the presence of a transition metal catalyst, including metallocenes. The butadiene (e.g., 1,3-butadiene), isoprene, or styrene is introduced directly into the polymerization zone of the reactor or carried into the polymerization zone as with the recycle gas stream or a combination of both. The temperature within the polymerization zone can be maintained below the condensation temperature of the butadiene or isoprene in the zone. Or, in another embodiment, the conditions (e.g., temperature, pressure, concentration of butadiene, isoprene, or styrene) within the polymerization zone are such that essentially no liquid is present in the zone that is not adsorbed on or absorbed in solid particulate matter. Alternatively, the conditions with the polymerization zone are maintained such that a portion of the butadiene, isoprene, or styrene-butadiene monomers is a liquid that is not adsorbed on or absorbed in the solid particulate matter.

The rare earth and transition metal catalysts employed in the polymerization zone are not limited to any particular class of rare earth or transition metal catalyst. Rare earth and transition catalysts that have been previously employed in slurry, solution, or bulk polymerizations of higher boiling or readily condensable monomers (e.g., butadiene, isoprene, or styrene) can be utilized in this invention.

The rare earth metal catalysts can have a rare earth metal precursor component, a co-catalyst component, and optionally a promoter. The precursor component can be a single compound or a mixture of two or more rare earth metal compounds. The precursor component can be introduced to the polymerization zone in a solution or slurry, on a support (e.g., silica, carbon black, porous crosslinked polystyrene or polypropylene, alumina, or magnesium chloride), spray dried, or as a prepolymer.

Any compound, organic or inorganic, of a metal chosen from those of Group IIIB of the Periodic Table of the Elements an atomic number of between 57 and 103 can be employed herein. Examples of rare earth metal compounds are compounds of cerium, lanthanum, praseodymium, gadolinium and neodymium. Of these compounds, carboxylates, alcoholates, acetylacetonates, halides (including ether and alcohol complexes of neodymium trichloride), and allyl derivatives of the metals are preferred. Neodymium compounds are the most preferred. Illustrative neodymium compounds can include neodymium naphthenate, neodymium octanoate, neodymium octoate, neodymium trichloride, neodymium trichloride complexes formed with tetrahydrofuran (e.g., $NdCl_3(THF)_2$) and ethanol (e.g., $(NdCl_3(EtOH)_3)$, neodymium 2,2-diethylhexanoate, neodymium 2-ethylhexoate, neodymium 2-ethyloctoate, neodymium 2,2-diethyl heptanoate, allyl neodymium dichloride, bis-allyl neodymium chloride, and tris-allyl neodymium. Neodymium neodecanoate, neodymium octanoate, neodymium versatate, and p-allyl neodymium dichloride give particularly good results. A mixture of rare earth metal catalysts can be employed. And, one or more rare earth metal catalysts can also be used in combination with at least one transition metal catalyst (including a metallocene catalyst) in a single reactor or in multiple reactors, preferably in series.

In general, the rare earth compounds, particularly the neodymium compounds used to prepare the rare earth catalysts described herein can be obtained as solutions or suspensions in known diluents (aliphatic, aromatic and/or oxygenated hydrocarbons) containing no or small amounts of water (0.001 to 5%) and/or with an excess of ligand (0.001 to 10 equivalents). Other reagents such as alcohols, carboxylic acids, amines, amides or ethers can be added to the solutions or suspensions to maintain the solubility of the rare earth compound. Preferably, the hydrocarbon solutions or suspensions of the rare earth compound (e.g., neodymium compound) will contain 0 to 2500 ppm water and 0.5 to 2 equivalents of free ligand such as, for example, versatic acid. The neodymium compound is typically used as a 1 to 50 wt % solution. These solutions or suspensions, such as, for example, neodymium versatate in hexane (8.9% Nd; 9.3% versatic acid; 150 ppm water, Lot #9534101) used in some of the examples herein can be obtained from Rhone-Poulenc.

A single site catalyst is another preferred catalyst which can be employed alone or in combination with a rare earth metal catalyst and/or transition metal catalyst to make polybutadiene, polyisoprene, butadiene-isoprene rubber, isoprene-styrene rubber, or styrene-butadiene rubber. One such single site catalyst is the one disclosed in U.S. Pat. No. 5,527,752 to Reichle et al. This metallocene catalyst comprises complexes of transition metals, substituted or unsubstituted p-bonded ligands (e.g., $CpTiCl_3$) and heteroallyl moieties, useful as catalyst precursors in polyolefin polymerizations typically in conjunction with a cocatalyst such as MAO or MMAO.

Rare earth catalyst modifiers and co-catalysts consist of aluminum alkyl halides and trialkyl aluminum compounds as described in WO 96/04323. Preferred co-catalysts that can be employed with the rare earth metal precursor component include triethylaluminum (TEAL), triisobutylaluminum (TIBA), trihexylaluminum (THAL), methylaluminoxane (MAO), modified methylaluminoxane (MMAO), trimethylaluminum (TMA), a dialkyl aluminum hydride or a mixture of a dialkyl aluminum hydride or a mixture of a dialkyl aluminum hydride and a trialkyl aluminum. When employed, promoters that can be used with rare earth metal compounds include one or more Lewis acids such as $BCl_3$, $AlCl_3$, ethylaluminum dichloride, ethylaluminum sesquichloride, diethylaluminum chloride, and other alkyl radical derivatives. Also, organohalide derivatiives such as those enumerated in the above-identified WO 96/04323 can be employed.

The conventional Ziegler-Natta catalysts which can be used in the practice of this invention are those formed by reacting a metal alkyl or hydride with a transition metal compound. Those formed by reacting an aluminum alkyl with salts of metals of Groups I to III of the Periodic Table of the Elements are particularly useful.

Illustrative of the catalysts useful in the practice of this invention are the following:

A. Titanium based catalysts such as those described in U.S. Pat. Nos. 4,376,062; 4,379,758.

B. Chromium based catalysts such as those described in U.S. Pat. Nos. 3,709,853; 3,709,954; and 4,077,904.

C. Vanadium based catalysts such as vanadium oxychloride and vanadium acetylacetonate.

D. Metallocene catalysts such as those described in U.S. Pat. Nos. 4,530,914; 4,665,047; 4,752,597; 5,218,071; 5,272,236; 5,278,272; 5,317,036; and 5,527,752.

E. Cationic forms of metal halides.

F. Cobalt catalysts and mixture thereof such as those described in U.S. Pat. Nos. 4,472,559 and 4,182,814.

G. Nickel catalysts and mixtures thereof such as those described in U.S. Pat. Nos. 4,155,880; 4,102,817; PCT 95/09826(US) and PCT 95/09827(US).

The transition metal catalysts employed in the process of this invention can have a metal component, a co-catalyst, and optionally a promoter. The metal component can be a transition metal compound or a mixture of two or more transition metal compounds. In general, the transition metal component of the catalyst can be soluble or insoluble, supported or unsupported, or spray dried in either the presence or absence of a filler. Alternatively, the polymerization catalyst can be introduced to the polymerization zone in the form of a prepolymer using techniques known to those skilled in the art or as decribed herein for EPRs and EPDMs.

When the metal component is supported, typical supports can include, for example, silica, carbon black, porous crosslinked polystyrene, porous crosslinked polypropylene, alumina, thoria, zirconia, or magnesium halide (e.g., magnesium chloride) support materials. Silica, carbon black, and alumina are preferred support materials. Silica and carbon black are the most preferred support materials. A typical silica or alumina support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 Angstroms and preferably at least about 200 Angstroms. Generally, the amount of support used is that which will provide about 0.1 to about 1.0 millimole of transition metal per gram of support. In a preferred embodiment, two types of carbon black are used as support. DARCO G-60 (pH of water extract=5) is used as dry powder having a surface area of 505 square meters per gram, average particle size of 100 microns, and porosity of 1.0 to 1.5 cubic centimeter per gram. NORIT A (pH of water extract=9-11) used as a dry powder has a surface area of 72 0 square meters per gram, average particle size of 45 to 80 microns.

The metal component can be impregnated on a support by well known means such as by dissolving the metal compound in a solvent or diluent such as a hydrocarbon or tetrahydrofuran in the presence of the support material and then removing the solvent or diluent by evaporation such as under reduced pressure. Alternatively, the transition metal component can be dissolved in a solvent or diluent such as a hydrocarbon or tetrahydrofuran and spray dried to generate a well-shaped catalyst precursor having little or no silica or other inorganic solids content, if desired.

The preferred transition metal compounds for making polybutadiene and polyisoprene are compounds containing nickel, titanium, and cobalt, with cobalt and nickel compounds being the most preferred. Nickel compounds of the metal component of the catalyst are organonickel compounds of nickel with mono- or bidentate organic ligands containing up to 20 carbon atoms. "Ligand" is defined as an ion or molecule bound to and considered bonded to a metal atom or ion. Mono-dentate means having one position through which covalent or coordinate bonds with the metal may be formed; bidentate means having two positions through which covalent or coordinate bonds with the metal may be formed. The organonickel compounds are generally soluble in inert solvents. Thus, any salt or an organic acid containing from about 1 to 20 carbon atoms may be employed. Representative of organonickel compounds are nickel benzoate, nickel acetate, nickel naphthenate, nickel octanoate, nickel neodecanoate, nickel 2-ethylhexanoate, bis(-A-allyl nickel), bis(ncycloocta-1,5-diene), bis(n-allyl nickel trifluoroacetate), bis(a-furyl dioxime) nickel, nickel palmitate, nickel stearate, nickel acetylacetonate, nickel salicaldehyde, bis(salicyladehyde) ethylene diimine nickel, bis(cyclopentadiene) nickel, cyclopentadienylnickel nitrosyl and nickel tetracarbonyl. The preferred component containing nickel is a nickel salt of a carboxylic acid or an organic complex compound of nickel.

Co-catalysts that can be employed with the component containing nickel include triethylaluminum (TEAL), triisobutylaluminum (TIBA), diethyl aluminum chloride (DEAC), partially hydrolyzed diethyl aluminum chloride (DEACO), methylaluminoxane (MAO), or modified methylaluminoxane (MMAO).

When MAO or MMAO is employed as the co-catalyst, it may be one of the following: (a) branched or cyclic oligomeric poly(hydrocarbylaluminum oxide)s which contain repeating units of the general formula —(Al(R''')O)—, where R''' is hydrogen, an alkyl radical containing from 1 to about 12 carbon atoms, or an aryl radical such as a substituted or unsubstituted phenyl or naphthyl group; (b) ionic salts of the general formula $[A^{+1}[BR^*_4]^{-1}$, where A+ is a cationic Lewis or Bronsted acid capable of abstracting an alkyl, halogen, or hydrogen from the transition metal component of the catalyst, B is boron, and R* is a substituted aromatic hydrocarbon, preferably a perfluorophenyl radical; and (c) boron alkyls of the general formula $BR^*_3$, where R* is as defined above.

Aluminoxanes are well known in the art and comprise oligomeric linear alkyl aluminoxanes represented by the formula:

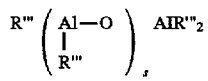

and oligomeric cyclic alkyl aluminoxanes of the formula:

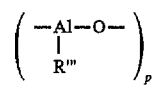

wherein s is 1 to 40, preferably 10 to 20; p is 3 to 40, preferably 3 to 20; and R''' is an alkyl group containing 1 to 12 carbon atoms, preferably methyl or an aryl radical such as a substituted or unsubstituted phenyl or naphthyl radical. Modified methylaluminoxane is formed by substituting 20–80 wt % of the methyl groups with a $C_2$ to $C_{12}$ group, preferably with isobutyl groups, using techniques known to those skilled in the art.

Promoters that can be used with the component containing nickel include hydrogen fluoride (HF), borontrifluoride ($BF_3$), or an etherate of HF and/or $BF_3$.

The titanium compound (titanates) can be $TiCl_4$, $TiBr_4$, $TiI_4$ or $Ti(OR)_4$ wherein R is an alkyl radical.

Co-catalysts that can be employed with the component containing titanium include TEAL, TIBA, dialkylaluminum iodide, and MAO.

Promoters that can be used with the component containing titanium include iodine and organic etherates. For isoprene, the combination $TiCl_4$, TIBA, and DPE (diphenyl ether) is employed.

The cobalt compound can be any organic compound such as the cobalt salts of organic acids, cobalt complexes and the like. Preferably, the cobalt compound is selected from the group consisting of cobalt β-ketone complexes, for example, cobalt (II) acetylacetonate and cobalt (III) acetylacetonate; cobalt β-ketoacid ester complexes, for example, cobalt acetylacetonate ethylester complexes; cobalt salts of organic carboxylic acids having 6 or more carbon atoms, for example, cobalt octoate, cobalt naphthenate, and cobalt benzoate; and cobalt halide complexes, for example, cobalt chloride-pyridine complexes; cobalt-chloride-phosphine complexes; cobalt-chloride-ethyl alcohol complexes and cobalt complexes coordinated with butadiene, for example, (1,3-butadiene) [1-(2-methyl-3-butenyl)-π-allyl]-cobalt which may be prepared, for example, by mixing a cobalt compound with an organic aluminum compound, organic lithium compound or alkyl magnesium compound and 1,3-butadiene. Other typical cobalt compounds are cobalt sorbate, cobalt adipate, cobalt 2-ethylhexoate, cobalt stearate, and the like compounds wherein the organic portion of the molecule contains about 5 to 20, preferably 8 to 18 carbon atoms and one or two carboxylic functions, as well as acetylacetonate.

Co-catalysts that can be employed with the component containing cobalt include ethylaluminum sesquichloride (EASC), ethylaluminum dichloride (EADC), DEACO, MAO and mixtures thereof.

Water in small amounts can be used as a promoter with the metal component containing cobalt, if desired.

Steps can be taken to reduce agglomeration in the gas phase polymerization. For example, in a preferred embodiment fluidization aids or inert particulate materials such as carbon black, silica, clay, alumina, calcium carbonate, and talc can be provided as described in U.S. Pat. No. 4,994,534. Of these, carbon black, silica, and mixtures of them are preferred. Fluidization aids are employed in amounts ranging from about 0.3% to about 80% by weight based upon the weight of the final polymer product produced. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, quick change of gas composition, selective use of static-neutralizing chemicals, and surface passivation with aluminum alkyls.

Static can also be controlled by using small amounts of an inert conductive particulate material such as carbon black. The amount of inert particulate material is that which is sufficient to control static, i.e., about 0.5 to about 1.5 percent by weight based on the weight of the fluidized bed. The mean particle size of the inert conductive particulate material is in the range of about 0.01 to about 150 microns, preferably to about 10 microns. The mean particle size can refer to the particle per se or to an aggregate as in the case of carbon black. The carbon black employed can have a primary particle size of about 10 to about 100 nanometers and an average size of aggregate (primary structure) of about 0.1 to about 10 microns. The surface area of the carbon black can be about 30 to about 1500 square meters per gram and can display a dibutylphthalate (DBP) absorption of about 80 to about 350 cubic centimeters per 100 grams. It is preferred to treat the particulate material prior to its introduction into the reactor to remove traces of moisture and oxygen. This can be accomplished by purging the material with nitrogen gas, and heating using conventional procedures. In addition to carbon black, other antistatic agents are also found to be effective in keeping the static level under control as mentioned, for example, in U.S. Pat. No. 5,194,526.

All patents mentioned in this application are hereby incorporated by reference.

The following examples will further illustrate the present invention.

EXAMPLES

This invention was tested in the pilot plant and illustrated by a number of examples. In each example, a sticky polymer was produced continuously in a gas-phase, fluidized bed reactor such as that taught in U.S. Pat. Nos. 4,482,687 and 4,994,534. The catalyst was a high oxidation state vanadium ($V^{+3}$ or higher) catalyst such as vanadium (acetylacetonate)$_3$ supported on silica particles as described in Ser. No. 083616, filed Jun. 28, 1993, or fed as a solution in a suitable solvent such as toluene or methylene chloride. The catalyst system also included an alkyl as cocatalyst, e.g. diethyl aluminum chloride (DEAC), and a promoter such as ethyl trichloroacetate (ETCA). Ethylene, hydrogen, and comonomers (propylene or the combination of propylene and diene) were continuously fed to the reactor. In each of the examples the diene used was ethylidene norbornene (ENB). A fluidization aid such as carbon black and/or calcined silica was used to make these sticky polymer products at a reaction temperature above their sticking temperature.

Control Example 1

The reactor was started under conditions that produced an ethylene-propylene-diene terpolymer using a supported vanadium (acetylacetonate)$_3$ catalyst and DEAC/ETCA catalyst system at 35° C. The reactor was operated at $C_3/C_2$ molar ratio of 1.2 and $H_2/C_2$ ratio of 0.20 to 0.29. Carbon black was fed to the reactor as a fluidization aid at a level of 10 to 15% in the resin by weight. As the reaction was stabilized to produce an EPDM hose and tube product, the recycle gas flow began to gradually drop indicating the initiation of fouling in parts of the recycle gas system such as the recycle line, compressor and heat exchanger. The fouling in the recycle gas system continued until the recycle gas flow had dropped below the minimum level needed to keep good fluidization. This resulted in reactor shutdown within 3 days.

Example 2: Use of Isopropanol (IPA)

The reactor was started at similar conditions as in Control Example 1 using the above catalyst system to produce EPDM products with Mooney viscosity in the range of 40 to 80 and diene content of 2 to 4 wt %. The reactor was operated at 40° C. reaction temperature and $C_3/C_2$ of 1.2 to 1.4 and $H_2/C_2$ of 0.05 to 0.1. Again, carbon black was used as a fluidization aid in the range of 10 to 15 wt %. IPA diluted in isopentane (10 wt % IPA in isopentane) was continuously fed upstream of the cycle gas compressor in the recycle line. The IPA solution was fed into the recycle line at a feed rate based on resin production. The IPA feed rate was about 350 to 400 ppm weight based on resin production rate.

The reactor operated smoothly with negligible to minor fouling in the recycle gas system for about 3 weeks.

Example 3: Use of Isopropanol

The reactor was started under similar conditions as in Example 2 above using the same catalyst system to produce EPDM products. The reactor was operated at $C_3/C_2$ of 1.2 and $H_2/C_2$ ratio of 0.025 to 0.065 to make EPDM products with 40 to 106 Mooney viscosity and 2 to 9.5 wt % diene content. Carbon black in the range of 10 to 25 wt % in the resin was used as fluidization aid. IPA diluted in isopentane (4 wt %) was fed continuously to the reactor at two locations in the recycle line: one location close to the entrance of the recycle line and another location upstream of the cycle gas compressor. The IPA solution feed rate was controlled to have about 700 to 900 ppm (weight) based on resin production.

The reactor operated smoothly with negligible to minor fouling in the recycle system for over 6 days when the reactor was transitioned to other conditions.

Comparative Example 4: Use of NPTMS

In this example NPTMS (n-propyltrimethoxysilane) a potential antifouling agent was tested for use in EPR and/or EPDM polymerizations. The reactor was started under similar conditions as in Example 2 above except for feeding NPTMS solution in place of IPA solution. NPTMS diluted in isopentane (2.5 wt %) was fed continuously to the recycle line upstream of the cycle gas compressor. The level of NPTMS feed rate was limited to 200 to 400 ppm (weight) based on the resin production rate because of the NPTMS detrimental effect on catalyst productivity. A gradual loss in recycle gas flow was observed within hours of introducing NPTMS to the cycle line indicating fouling in the recycle line system. The reactor was forced down within 1.5 days due to fouling in the recycle line.

Control Example 5: EPDM with Silica/Carbon-Control

The reactor was started up under similar conditions as in Control Example 1 to make EPDM hose and tube type product. Carbon black was initially used as fluidization aid until the reaction was stabilized. Later on, the carbon black feed rate was reduced and calcined silica feed was established. The carbon black feed rate was reduced to a level that left about 1 to 2 wt % in the resin to minimize electrostatic effects. Silica feed rate as adjusted to have about 4 wt % in the resin. The recycle gas flow began to gradually drop indicating fouling in the recycle line system. The reactor was finally forced down within 1.5 days due to heavy fouling.

Example 6: EPDM With Silica/Carbon Black and Isopropanol

The reactor was started up under Control Example 5 conditions. Carbon black feed was reduced to 1 to 2 wt % of the resin and silica feed was established to have about 3 to 7 wt % in the resin. Isopropanol diluted in isopentane was fed continuously to the recycle line at two locations: one location close to entrance of the recycle line and another location upstream of the cycle gas compressor. The IPA solution feed rate was controlled to have about 400 to 600 ppm weight based on resin production. The reactor operated smoothly with negligible fouling in the recycle line system for over 3 days with silica and carbon black as fluidization aids and an additional 4 days with carbon black alone as the fluidization aid.

Example 7

According to the process of the invention, a fluidized bed reaction system as described above, was operated as described below to produce polybutadiene. The polymer was produced under the following reaction conditions: 30° C. reactor temperature and 100 psia reactor pressure. The volume of the reactor was 55 ft$^3$; the resin's weight inside the reactor was 112 lbs. The catalyst system employed in this Example was cobalt(acetylacetonate)3 with partially hydrolyzed diethylaluminum chloride (DEACO) as co-catalyst. The production rate was 20 lb/h. The product had a Mooney value of 55. Carbon black was fed as the fluidization aid, at a rate equal to 5 to 50 PHR of polymer.

Examples 8–13

The following examples set forth in tabular form, operating conditions for producing polymers in accordance with the invention. They illustrate the practice of the invention using different antifoulants, catalyst systems, and differing cycle gas compositions.

| | Example No. | | | |
|---|---|---|---|---|
| Product: | 7<br>Polybu-<br>tadiene | 8<br>Polybu-<br>tadiene | 9<br>Polybu-<br>tadiene | 10<br>SBR |
| Reaction Conditions: | | | | |
| Temperature (°C.) | 30 | 50 | 60 | 40 |
| Pressure (psi) | 100 | 110 | 100 | 110 |
| Superficial Velocity (ft/s) | 1.75 | 2.0 | 1.5 | 2.0 |
| Production Rate (lb/h) | 20 | 25 | 20 | 25 |
| Total Reactor Volume (ft$^3$) | 55 | 55 | 55 | 55 |
| Reaction Zone Volume (ft$^3$) | 7.5 | 7.5 | 7.5 | 7.5 |
| Bed Height (ft) | 7.0 | 7.0 | 7.0 | 7.0 |
| Bed Diameter (ft) | 1.17 | 1.17 | 1.17 | 1.17 |
| Bed Weight (lbs) | 112 | 112 | 112 | 112 |
| Cycle Gas Composition: | | | | |
| N$_2$ | 80 | 50 | 40 | 27.3 |
| Butadiene | 20 | 50 | 60 | 40 |
| Styrene | — | | | .2 |
| Catalyst | Co(acac)$_3$* | Nd(Ver)3/D | Nd(ver)3/ | CpTiCl3 |
| Co-catalyst: | DEACO | EAC/silica DIBAH | DEAC/silica DIBAH | MAO |
| Gas Phase Anti foulant Reagent (AR): | NH3 | NH3 | EtOH | NH3 |
| PPM AR | 10–100 | 10–100 | 50–300 | 10–100 |
| Polymer Composition: | | | | |
| Butadiene | 100 | 100 | 100 | 75 |
| Styrene | | | | 25 |

| | Example No. | | |
|---|---|---|---|
| Product: | 11<br>Polyisoprene | 12<br>Polybutadiene | 13<br>Polystyrene |
| Reaction Conditions: | | | |
| Temperature (°C.) | 70 | 50 | 40 |
| Pressure (psi) | 100 | 100 | 100 |
| Superficial Velocity (ft/s) | 1.5 | 1.75 | 1.5 |
| Production Rate (lb/h) | 20 | 20 | 40 |
| Total Reactor Volume (ft$^3$) | 55 | 55 | 55 |
| Reaction Zone Volume (ft$^3$) | 7.5 | 7.5 | 7.5 |
| Bed Height (ft) | 7.0 | 7.0 | 7.0 |
| Bed Diameter (ft) | 1.17 | 1.17 | 1.17 |
| Bed Weight(lbs) | 112 | 112 | 112 |
| Cycle Gas Composition: | | | |
| N$_2$ | 70 | 60 | 99.7 |
| Butadiene | — | 40 | — |
| Styrene | | | 0.3 |
| Isoprene | 30 | | |
| Catalyst | Nd(Ver)3/ DEAC/silica | Nickel octoate | Cp$_2$ZrMe$_2$** |
| Co-catalyst: Promoter | TIBA | TIBA HF(OBu$_2$) | MAO*** |
| Gas Phase Anti-foulant Reagent (AR): | Isopropyl-alcohol | THF | NH3 |
| PPM AR | 50–400 | 10–200 | 10–100 |
| Polymer Composition: | | | |
| Butadiene | | 100 | — |
| Styrene | | | 100 |
| Isoprene | 100 | | — |

*Cobalttriacetylacetonate
**Dicyclopentadienylzirconiumdimethyl
***Methylalumoxane

What is claimed is:

1. A method for inhibiting polymer build-up in a recycle line and a heat exchanger during polymerization of butadiene, isoprene, styrene, and mixtures thereof in the presence of a rare earth metal or transition metal catalyst or combination thereof which comprises introducing as an antifouling agent an alcohol having 1 to 20 carbon atoms, an alkyl or cycloalkyl monoether having 2 to 20 carbon atoms, ammonia, an ester of an inorganic acid, a compound of a group IV element of the periodic table, an alkyl and aryl amines, a sulfur-containing compound, or a mixture thereof at one or more locations in the recycle gas line in an amount sufficient to inhibit build-up of polymer product.

2. The method according to claim 1 wherein the polymerization employs carbon black, silica, clay, calcium carbonate, alumina, talc, and mixtures thereof as a fluidization aid.

3. The method according to claim 2 wherein the rare earth metal catalyst contains a precursor selected from the group consisting of neodymium neodecanoate, neodymium octanoate, neodymium versatate, p- allyl neodymium dichloride, and mixtures thereof; and wherein the transition metal catalyst is selected from the group consisting of a compound of nickel, cobalt, titanium, and mixtures thereof.

4. The process of claim 3 wherein the nickel compound is selected from the group consisting of nickel benzoate, nickel acetate, nickel naphthenate, nickel octanoate, nickel neodecanoate, nickel 2-ethylhexanoate, bis(-A-allyl nickel), bis(ncycloocta-1,5-diene), bis(n-allyl nickel trifluoroacetate), bis(a-furyl dioxime) nickel, nickel palmitate, nickel stearate, nickel acetylacetonate, nickel salicaldehyde, bis(salicyladehyde) ethylene diimine nickel, bis(cyclopentadiene) nickel, cyclopentadienylnickel nitrosyl, nickel tetracarbonyl, and mixtures thereof; and wherein the cobalt compound is selected from the group consisting of cobalt p-ketone complexes; cobalt β-ketoacid ester complexes; cobalt salts of organic carboxylic acids having 6 or more carbon atoms; and cobalt halide complexes; cobalt-chloride-phosphine complexes; cobalt-chloride-ethyl alcohol complexes, cobalt complexes coordinated with butadiene, cobalt sorbate, cobalt adipate, cobalt 2-ethylhexoate, cobalt stearate, and mixtures thereof.

5. The method according to claim 3 wherein the catalyst is in supported, solution, slurry, prepolymer or spray dried form.

6. The method according to claim 1 wherein the antifouling agent is employed in an amount of about 0.01% to about 0.2% based on the weight the polymer being produced.

7. The method according to claim 6 wherein the antifouling agent is selected from the group consisting of tetrahydrofuran, methanol, ethanol, ammonia, dimethyl sulfate, trimethyl phosphite, and mixtures thereof.

8. The method according to claim 7 wherein the polymerization is conducted in a stirred or gas phase fluidized polymerization vessel.

9. The method according to claim 8 wherein the polymerization is conducted in the presence of one or more rare earth metal catalysts in combination with at least one transition metal catalyst.

10. The method according to claim 9 wherein at least one of the transition metal catalysts is a single site catalyst.

11. The method according to claim 10 wherein at least one of the transition metal catalysts is a complex of transition metals, substituted or unsubstituted p-bonded ligands and heteroallyl moieties.

* * * * *